(12) United States Patent
Rooker et al.

(10) Patent No.: US 7,308,903 B2
(45) Date of Patent: *Dec. 18, 2007

(54) PRESSURE RELIEF DEVICE

(75) Inventors: Mitch Rooker, Sand Springs, OK (US); Greg Klein, Owasso, OK (US); Charlie Beair, Tulsa, OK (US); Geof Brazier, Woodbury, MN (US)

(73) Assignee: BS&B Safety Systems Limited, Limerick (IE)

( * ) Notice: Subject to any disclaimer, the term of this patent is extended or adjusted under 35 U.S.C. 154(b) by 0 days.

This patent is subject to a terminal disclaimer.

(21) Appl. No.: 11/324,802

(22) Filed: Jan. 4, 2006

(65) Prior Publication Data

US 2006/0169319 A1    Aug. 3, 2006

Related U.S. Application Data

(63) Continuation of application No. 10/787,185, filed on Feb. 27, 2004, now Pat. No. 7,011,104.

(60) Provisional application No. 60/450,360, filed on Feb. 28, 2003.

(51) Int. Cl.
*F16K 17/40* (2006.01)

(52) U.S. Cl. .............................. 137/68.29; 137/68.22; 137/68.24; 137/68.25; 220/89.3

(58) Field of Classification Search ............ 137/68.22, 137/68.23, 68.24, 68.25, 68.26, 68.27, 68.28, 137/68.29, 68.3; 220/89.2, 89.3
See application file for complete search history.

(56) References Cited

U.S. PATENT DOCUMENTS

| | | | | |
|---|---|---|---|---|
| 2,766,904 A | * | 10/1956 | Philip ..................... 220/89.2 |
| 3,881,629 A | * | 5/1975 | Shaw et al. ................ 220/89.2 |
| 4,079,854 A | | 3/1978 | Shaw et al. |
| 4,119,236 A | * | 10/1978 | Shaw et al. ................ 220/89.3 |
| 4,342,988 A | | 8/1982 | Thompson et al. |
| 4,580,691 A | * | 4/1986 | Hansen ..................... 220/89.3 |
| 4,657,157 A | | 4/1987 | Short |
| 4,691,729 A | * | 9/1987 | Clift ........................ 137/68.25 |
| 4,819,823 A | * | 4/1989 | Kadakia et al. ............ 220/89.2 |
| 5,082,133 A | | 1/1992 | Farwell et al. |
| 5,368,180 A | | 11/1994 | Farwell et al. |
| 5,720,380 A | | 2/1998 | Graham |
| 6,321,771 B1 | * | 11/2001 | Brazier et al. ........... 137/68.23 |
| 6,945,420 B2 | | 9/2005 | Krebill et al. |
| 7,011,104 B2 | * | 3/2006 | Rooker et al. ........... 137/68.29 |
| 7,017,767 B2 | * | 3/2006 | Eijkelenberg et al. ..... 220/89.2 |
| 2005/0103785 A1 | | 5/2005 | Eijkelenberg et al. |
| 2005/0103786 A1 | | 5/2005 | Eijkelenberg et al. |

* cited by examiner

*Primary Examiner*—Ramesh Krishnamurthy
(74) *Attorney, Agent, or Firm*—Finnegan, Henderson, Farabow, Garrett & Dunner, L.L.P.

(57) ABSTRACT

A pressure relief device is provided. The pressure relief device includes a sealing member and a low-pressure support member that is adapted to provide support to the sealing member when the sealing member is subject to a certain pressure differential. The low pressure support member includes an annular flange and at least one supporting projection. A cutting element is adapted to puncture the sealing member when the sealing member is subject to a predetermined pressure differential. The pressure relief device may further include a high pressure support member and safety heads forming a pre-torqued assembly. The supporting projection may optionally include an area of weakness either wholly within or on the periphery thereof.

23 Claims, 11 Drawing Sheets

PRESSURE RELIEF DEVICE

REFERENCE TO PRIOR APPLICATIONS

This is a continuation of application Ser. No. 10/787,185, filed Feb. 27, 2004 now U.S. Pat. No. 7,011,104, which claims the benefit of U.S. Provisional Application No. 60/450,360, filed Feb. 28, 2003, all of which are incorporated herein by reference.

FIELD OF THE INVENTION

This invention generally relates to a safety device for a storage and/or pressurized system. More particularly, the present invention relates to a pressure relief device for a sealed system.

BACKGROUND OF THE INVENTION

Many industries utilize systems that hold or process a pressurized fluid. Each such system typically includes a safety device designed to prevent the over-pressurization or under-pressurization of the system. In an emergency situation where the pressure differential between the system and the atmosphere endangers the physical integrity of the system, the safety device will create an opening to provide a vent path to relieve the pressure differential within the system. The opening allows fluid to flow into or out of the system to reduce the magnitude of the pressure differential in the system.

Some systems, such as, for example, systems used in the food processing industry, require protection from both over-pressure situations and under-pressure situations. In these types of systems, an under-pressure situation, or vacuum, within the system can damage sensitive equipment. In the food & drug processing industries, for example, a vacuum may be created in a system when the system is being cleaned after a completion of a process. Typically, these types of systems are cleaned and/or sterilized with a steam spray apparatus that removes any product or contamination from the system after a processing operation is completed and before the next processing step or cycle begins. If the system is not properly controlled during steam cleaning, a sudden vacuum can be developed, which may cause damage to the system. For example, if cold water were introduced to the system while steam cleaning, the steam may condense and create a vacuum situation.

Thus, to completely protect such a system, the pressure release device must provide two-directional pressure relief. The first direction of pressure relief prevents damage or safety hazards resulting from an over-pressurization, or a positive pressure differential situation. The second direction of pressure relief prevents damage or safety hazards resulting from under-pressurization, or a negative pressure differential situation. Since pressurized systems and atmospheric storage systems are typically designed to withstand a greater positive pressure differential than a negative pressure differential, an appropriate two-directional pressure relief device should have the ability to function when exposed to significantly different pressure differentials.

It should be noted that some systems are unlikely to encounter an over-pressure situation and, thus, the only risk is exposure to a negative pressure differential. In these types of systems, a pressure relief device need only protect the system from a negative pressure differential.

Some systems require pressure protection at very low levels, measured in "inches of water column" rather than "pounds per square inch." This type of low pressure protection may be required in both over-pressure and under-pressure directions, or just in one direction.

A typical two direction pressure relief device includes a sealing member that is sealingly engaged with the system. The sealing member is surrounded by a pair of support members. One support member releases the seal when the seal is exposed to a predetermined positive pressure differential and the other sealing member releases the seal when the seal is exposed to a predetermined negative pressure differential. To provide protection from a negative pressure differential only, the positive pressure support member may be omitted.

The positive pressure support member provides a backdrop for the sealing member and is configured to withstand a predetermined force. As the positive pressure in the system rises, the seal moves against the positive pressure support. When the pressure reaches a predetermined level, the positive pressure support releases the seal to create a vent path and reduce the pressure in the system. Typically, the positive pressure support member is a generally solid unit that has a series of holes, slits, or perforations. The holes allow fluid to enter the system if the seal releases under a negative pressure differential and the slits allow the support member to open when the positive pressure differential reaches a predetermined level. However, when opening in the negative pressure differential direction or in low pressure single direction applications, the positive pressure support does not always fully open, which results in an obstructed flow path for the venting fluid.

The negative pressure support, often referred to as a "girdle," is typically disposed between the system and the seal. When a light negative pressure differential acts on the seal, the seal moves towards the system and into contact with the girdle. The girdle buckles when the seal experiences a negative pressure differential. The amount of girdle buckling is directly related to the magnitude of the experienced pressure differential. The same girdle and seal combination may be used to provide a single direction low pressure relief device for either positive or vacuum relief.

However, the force of the negative pressure differential on the seal and girdle arrangement may not physically open the seal. Thus, a knife blade may be positioned adjacent the girdle to puncture the seal when the girdle buckles sufficiently under the negative pressure differential. If the girdle buckles progressively, as opposed to instantaneously, the knife blade may gently tear the seal providing a very small pressure relief path.

The flow path created through the seal may depend upon the size of the opening in the seal and the configuration of the positive pressure support. The larger the opening in the seal, the greater the flow path through the pressure relief device. However, the positive pressure support does not open when the seal opens under a negative pressure differential and thus acts as an impediment to fluid flow. The positive pressure support may include openings, or perforations, that allow fluid to flow through the seal under these conditions. The positive pressure support may limit the size of the created flow path to about 50% of the nominal cross sectional area of the pressure relief device.

In light of the foregoing, there is a need for a pressure relief device that (1) provides a high flow area for both positive and negative pressure releases; (2) consistently opens at a predetermined pressure differential in both the positive and negative directions; (3) provides a two-way device that operates at low pressures in both directions or at widely different set pressures in each direction; and provides reliable and improved opening in a low pressure direction.

SUMMARY OF THE INVENTION

In one aspect, the present invention is directed to a pressure relief device. The pressure relief device includes a sealing member and a low-pressure support member that is adapted to provide support to the sealing member when the sealing member is subject to a certain pressure differential. The low pressure support member includes an annular flange and at least one supporting projection. A cutting element is adapted to puncture the sealing member when the sealing member is subject to a predetermined pressure differential. The pressure relief device may further include a high pressure support member and safety heads forming a pre-torqued assembly. The supporting projection may optionally include an area of weakness either wholly within or on the periphery thereof.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE EMBODIMENTS

Reference will now be made in detail to exemplary embodiments of the present invention, examples of which are illustrated in the accompanying drawings. Wherever possible, the same reference numbers will be used throughout the drawings to refer to the same or like parts. An exemplary embodiment of a pressure relief device of the present invention is shown in FIG. 1 and is designated generally by reference number 20.

In accordance with the present invention, there is provided a pressure relief device for a pressurized system. As used herein, the term "pressurized system" includes any system that typically uses a pressure relief device adapted to open and create a vent path when exposed to a pressure differential that is typically measured in inches of water column. These system include, for example, systems designed to operate at pressures above atmospheric pressure and storage systems designed to operate at or near atmospheric pressure but may become plugged and, thus, require a pressure relief device. The pressure relief device includes a sealing element that is engageable with the system. Preferably, the sealing element is disposed between a pair of safety heads that are, in turn, sealingly engaged with the system. The present invention contemplates, however, that the sealing element may be sealingly engaged with the system in any similar manner, such as, for example, sealed between a pair of pipe flanges in the system.

Figure 1:
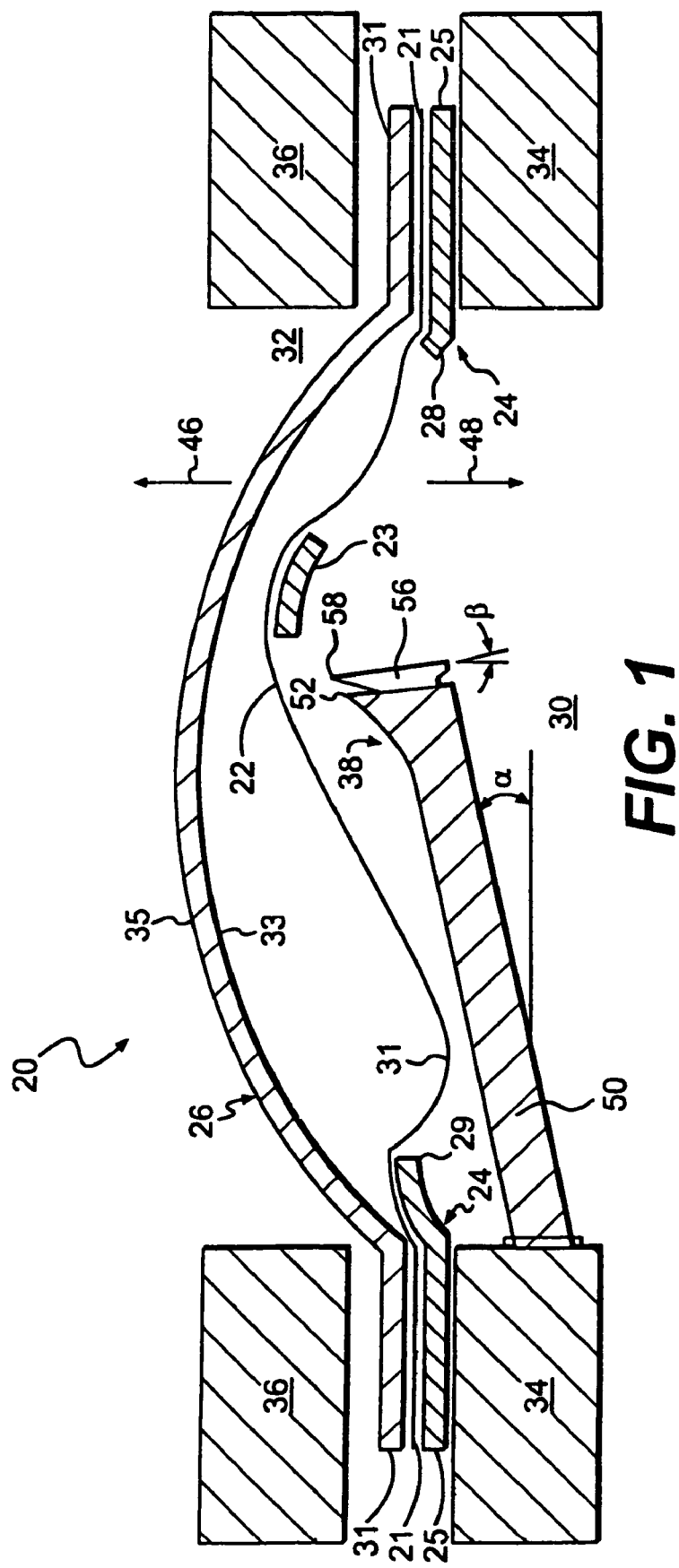
FIG. 1 is a side cross-sectional view of a pressure relief device according to an exemplary embodiment of the present invention.

As illustrated in FIG. 1, pressure relief device 20 includes a seal 22. Preferably, seal 22 includes an outer peripheral edge 21 that is sealingly engaged between a first safety head 34 and a second safety head 36. Seal 22 may be engaged between safety heads 34 and 36 by a series of bolts (not shown) configured to connect the safety heads together. As is well known in the art, safety heads may be pre-torqued. In a pre-torqued safety head design, a pressure relief device such as seal 22 is independently sealingly engaged between safety heads 34 and 36 prior to final installation of the device for applications in the field of use. This prior engagement saves time and minimizes the likelihood of damage to the pressure relief device during the final stage installation within the pressurized system. The pre-torqued design also provides the ability to remove the pressure relief device from the pressurized system for service, inspection, and maintenance, while still maintaining an independent sealing engagement of the pressure relief device between the companion safety heads 34 and 36

Pressure relief device 20 may be engaged with the system such that first safety head 34 is disposed adjacent the system. First safety head 34 includes a bore 30 that defines a fluid passageway. When first safety head 34 is engaged with the system, bore 30 allows the fluid in the system to contact seal 22, thereby exposing seal 22 to the pressure within the system.

Seal 22 may be made of a flexible material that responds to the pressure differential between the system and the surrounding environment. For example, seal 22 may flex in the direction of arrow 48 when the system is experiencing a negative pressure differential, i.e. the pressure in bore 32 of second safety member 36 is greater than the pressure in bore 30 of first safety member 34. Seal 22 may flex in the direction of arrow 46 when the system is experiencing a positive pressure differential, i.e. the pressure in bore 30 of first safety member 34 is greater than the pressure in bore 32 of second safety member 34. Preferably seal 22 is made of a flexible material, such as, for example, TEFLON. It is contemplated, however, that seal 22 may be made of any type of flexible material, such as plastic or metal.

In accordance with the present invention, the pressure relief device may provide pressure relief for the system when the sealing element is exposed to a negative pressure differential and/or a positive pressure differential. The pressure relief device may include a low-pressure support and/or a high-pressure support. The low-pressure support may be adapted to support the seal when the seal is exposed to a negative pressure differential. The high-pressure support may be adapted to support the seal when the seal is exposed to a positive pressure differential. If the particular application requires one-way pressure relief, either the low-pressure support member or the high-pressure support member may be omitted, depending upon the pressure differential magnitude at which pressure relief is desired.

In accordance with the present invention, the pressure relief device includes a low-pressure support member. The low-pressure support member is adapted to provide support to the sealing member when the sealing member is subject to a first pressure differential, such as, for example a negative pressure differential. The low pressure support member includes an annular flange and at least one supporting projection.

As illustrated in FIG. 1, pressure relief device 20 includes a low-pressure support member 24. Low-pressure support member 24 includes an annular flange 25 and at least one supporting projection, which may be, for example, arched section 23. Flange 25 may be disposed between outer peripheral surface 23 of seal 22 and first safety head 34.

Figure 2:
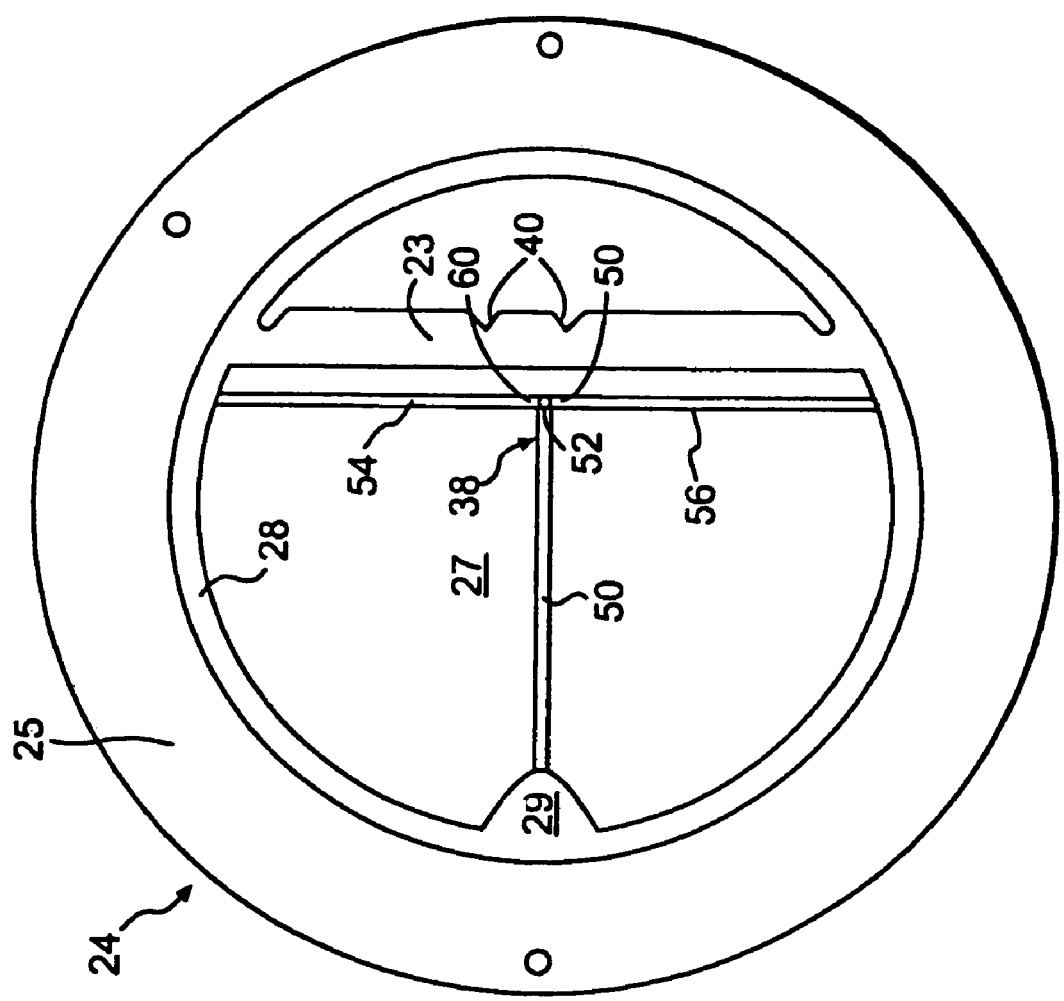
FIG. 2 is a top view of a low-pressure support member and a cutting element according to an exemplary embodiment of the present invention

As shown in FIG. 2, annular flange 25 defines an opening 27. Arched section 23 extends across opening 27 from one side of annular flange 25 to the opposite side of annular flange 25. As shown in FIG. 1, arched section 23 projects away from annular flange 25 and first safety head 34. When viewed from the side, arched section 23 may form an arch that extends over the annular flange 25.

In the exemplary embodiment illustrated in FIGS. 1 and 2, arched section 23 is offset from a centerline of opening 27. It is contemplated, however, that arched section 23 may be disposed in alignment with the centerline of opening 27 or at any offset from the centerline of opening 27.

Low-pressure support member 24 may also include a transition section 28 and a support tongue 29. Referring to FIG. 1, each of the transition section 28, support tongue 29, and arched section 23 provide support for seal 22 when seal 22 flexes in the direction of arrow 48, such as in response to a negative pressure differential. Seal 22 will drape over the arched section 23. Due to the offset position of arched section 23, a portion 31 of seal 22 may move further in the direction of arrow 48 than the remainder of seal 22. It is contemplated that the configuration of transition section 28 and support tongue 29, as well as the number of support tongues 29 may be varied to achieve the desired support of seal 22.

Arched section 23 is adapted to release seal 22 when the pressure differential over seal 22 reaches a predetermined magnitude. As the pressure differential acting on seal 22 increases, the resulting force exerted on arched section 23 will also increase. When the exerted force exceeds the structural integrity of arched section 23, arched section will buckle to thereby release seal 22.

The force at which arched section 23 will buckle is determined by many design parameters. For example, the shape of arched section 23, such as the thickness and width of arched section 23, will affect the force at which arched section 23 will buckle. Various exemplary configurations of arched section 23 are illustrated in FIGS. 3a-3j. One skilled in the art will recognize that the design parameters of arched section 23 may be varied in any number of ways to control the force and which arched section buckles.

The type of material used to construct arched section 23 will also affect the force at which arched section 23 will buckle. An arched section 23 made of a stronger material will buckle at a greater force than an arched section 23 made of a weaker material. The material for a particular arched section 23 may be selected to provide the structural support required for the intended application. It is contemplated that arched section 23 may be made from any type of material, including, for example, plastic, metal, or ceramic.

It is contemplated that the force and location at which arched section 23 buckles may be further controlled by introducing one or more areas of weakness 40 to arched section 23. Each area of weakness 40 may reduce the structural integrity of arched section 23 at a certain location in arched section 23. As shown in FIGS. 3a, 3b, 3c, 3d, and 3f, area of weakness 40 may be a notch, a groove, or a hole. Area of weakness 40 may also be another type of structural weakness, such as, for example, a dimple or a score or other intentionally introduced structural defect. It is also contemplated that arched section 23 may include multiple areas of weakness 40 at any location wholly within or along the periphery of arched section 23.

Figure 3C:
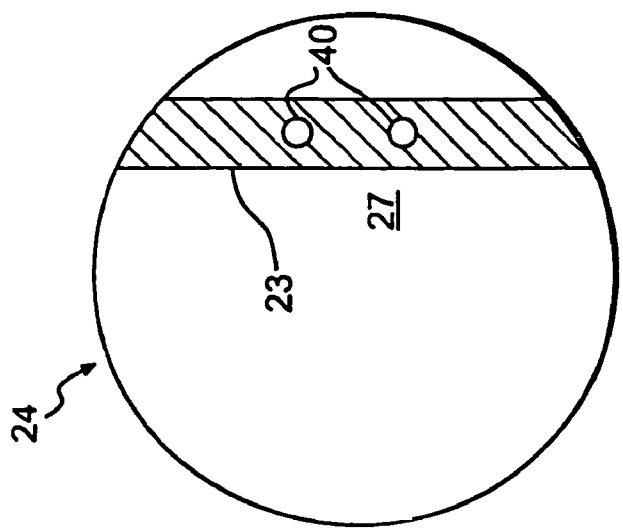
FIGS. 3*a*-3*j* are top views of a low-pressure support member in accordance with several exemplary embodiments of the present invention.
Figure 3B:
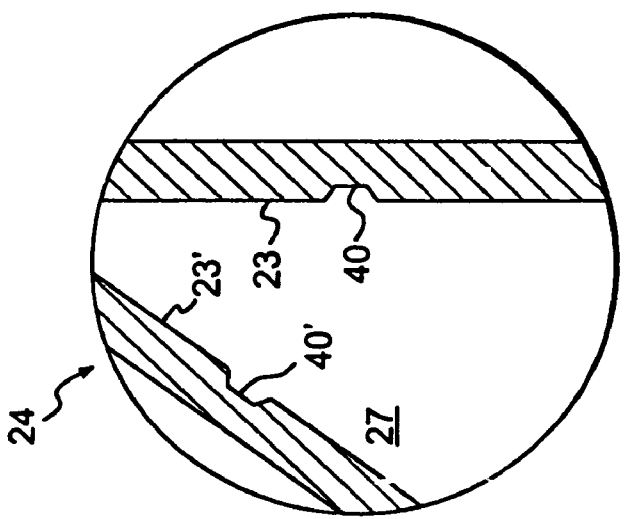
Figure 3A:
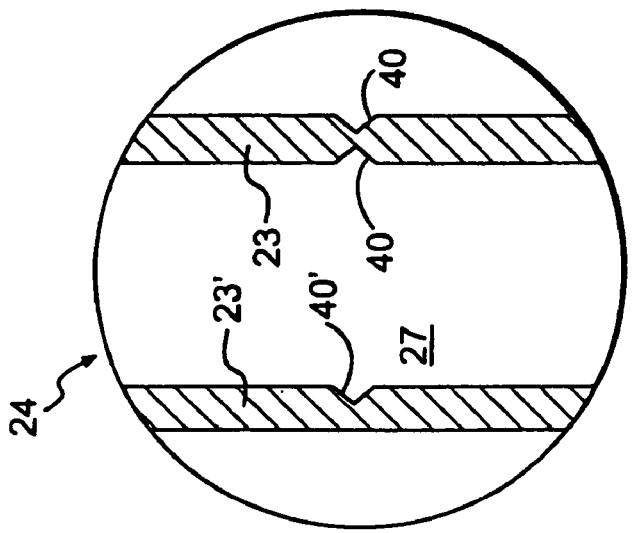
Figure 3F:
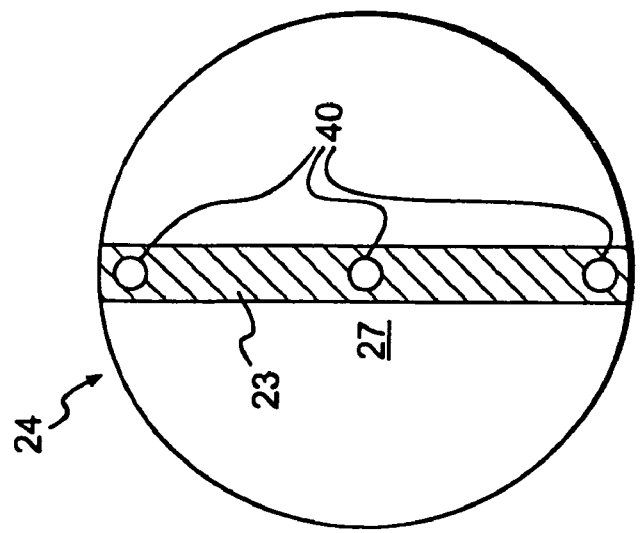
Figure 3E:
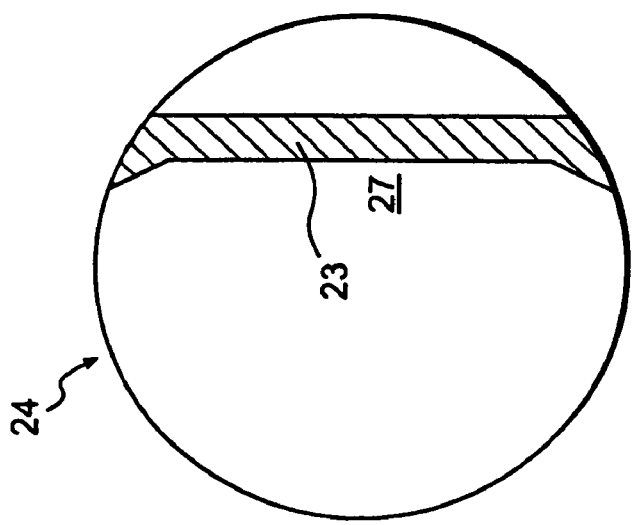
Figure 3D:
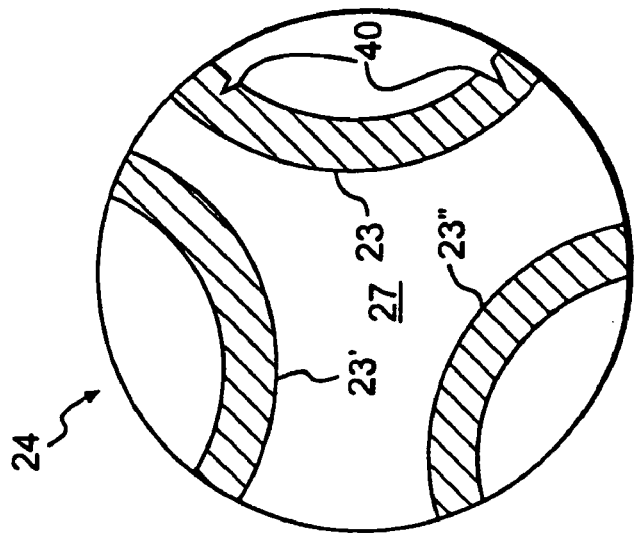
Figure 3I:
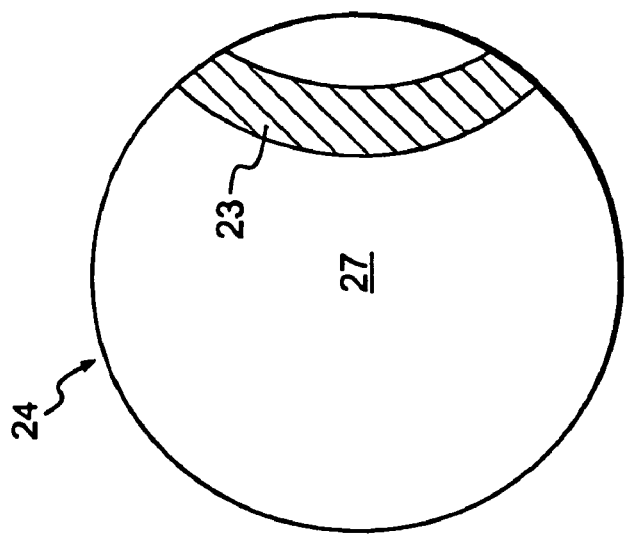
Figure 3H:
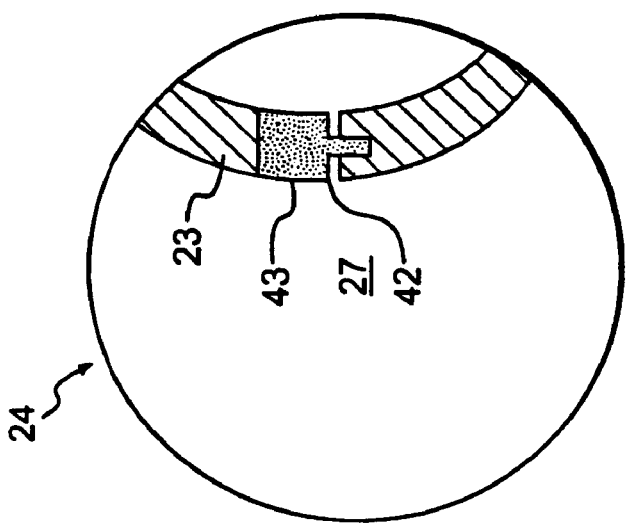
Figure 3G:
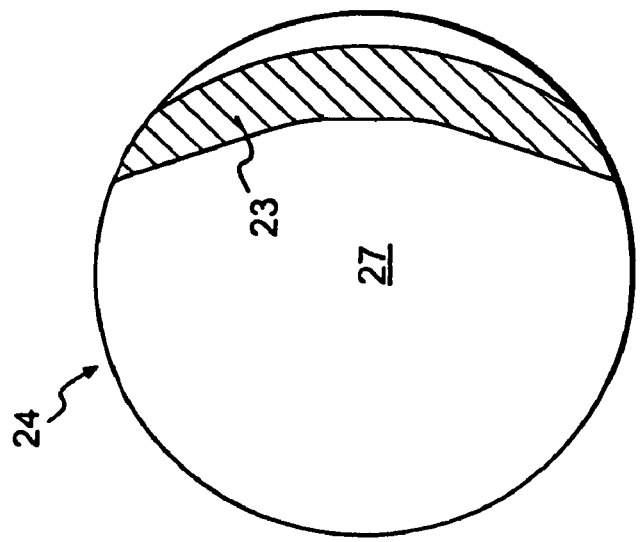
Figure 3J:
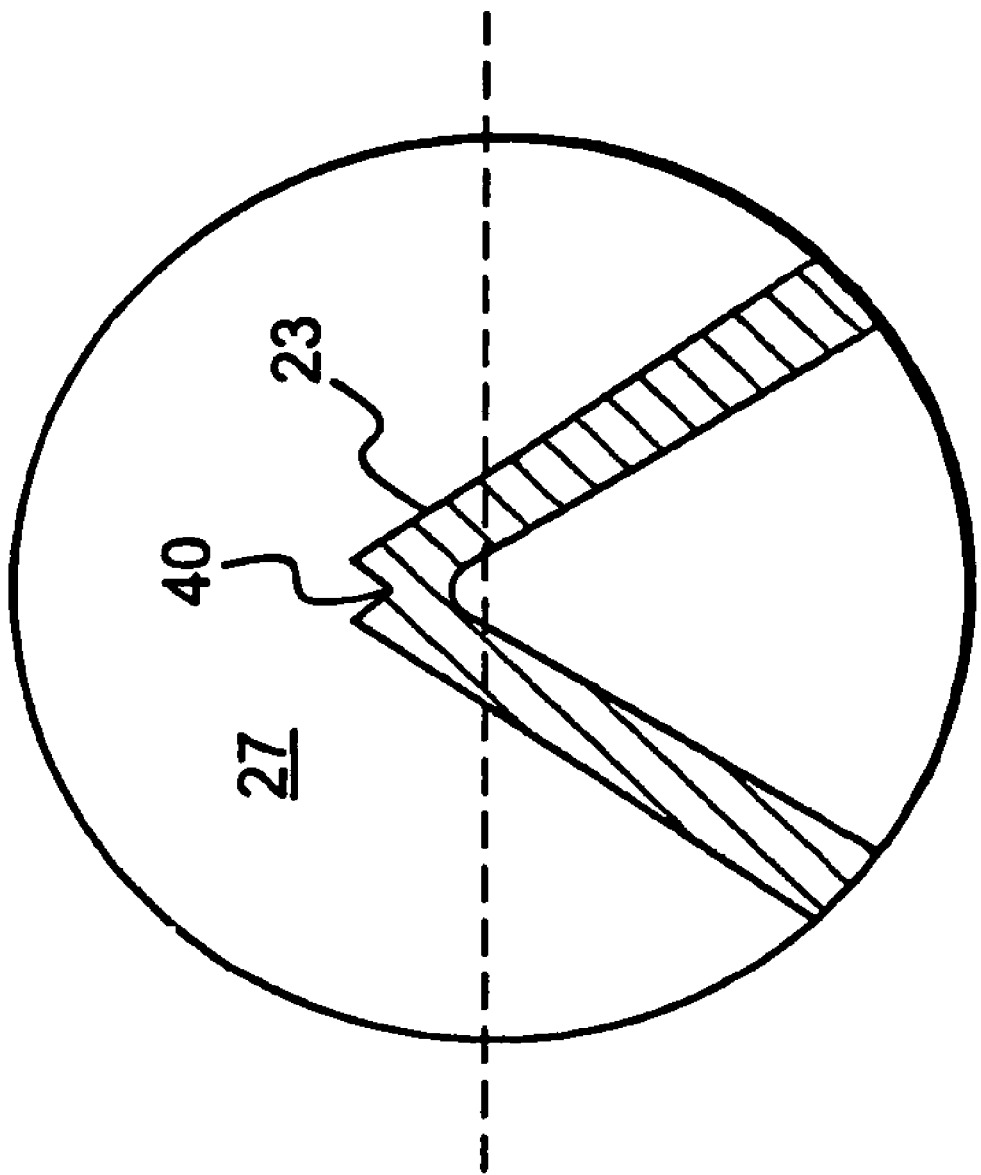

In addition, as illustrated in FIG. 3j, the force and location at which arched section 23 buckles may be controlled by a combination of factors such as both the shape of the arched section, as well as the size and location of an area of weakness 40. In the embodiment of FIG. 3j, opening 27 is equally divided by a centerline and arched section 23 is disposed within the opening such that a portion of the arched section lies on one side of the centerline and the remaining portion of the arched section lies on the opposite side of the centerline of opening 27. In the particular embodiment of FIG. 3j, the roots of the arched section 23 (i.e. where the arched section connects with the flange) are disposed on one side of the centerline and the peak of the arched section 23 is disposed on an opposing side of the centerline.

One skilled in the art will also recognize that the force at which arched section 23 collapses may be varied by changing the size, location, and number of areas of weakness 40 in arched section 23. In addition, the direction and manner in which the arched section collapses can be controlled depending on the size, location, and number of areas of weakness 40 provided in arched section 23.

In addition, as shown in FIG. 3h, the area of weakness in arched section 23 may be a cut 42 that extends across arched section 23. Cut 42 may align, for example, with the apex of arched section 23. A connecting member 43 may connect the two portions of arched section 23. Connecting member 43 may represent the weakest portion of arched section 23. Accordingly, the force at which arched section 23 buckles may be controlled by varying any design parameter of connecting member 43.

Introducing one or more areas of weakness 40 to arched section 23 may provide consistent buckling characteristics in low-pressure support member 24. As the buckling of arched section 23 will likely initiate at area of weakness 40, the design parameters of an area of weakness 40 may be controlled to ensure each arched section 23 buckles when exposed to a certain force. Thus, a weakened arch may be used to set a desired burst pressure for a disk. Accordingly, low-pressure support members 24 manufactured within the same lot and bearing the same features may be expected to buckle at or near the same pressure differential or load.

It is further contemplated that the force at which low-pressure support member 24 buckles may be altered by including multiple supporting projections. For example, as shown in FIGS. 3a and 3b, low-pressure support member 24 may include a second arched section 23'. As shown in FIG. 3a, second arched section 23' may mirror first arched section 23. Alternatively, as shown in FIG. 3b, second arched section 23' may have a different configuration than first arched section 23. In still another alternative, low-pressure support member 24 may include a third arched section 23". One skilled in the art will recognize that the force at which low-pressure support member 24 buckles to release seal 22 may be varied by changing the number, size, and location of the supporting projections. In addition, an area of weakness 40 may be introduced to each of the multiple arched sections 23 to further control the force at which low-pressure support member 24 buckles to release seal 22. Additionally, an area of weakness 40 may be introduced to one or more of the multiple arched sections 23 to control which arched section 23 may buckle first.

It should be noted that a low-pressure support member 24 that has a single supporting projection or a supporting projection with an area of weakness may be configured to buckle at a lower force than a low-pressure support 24 with multiple supporting projections. Accordingly, a stronger material may be used in a "single arch" configuration to achieve the same buckling force as a "multiple arch" configuration using a weaker material. This may allow the use of a thermally stable material, such as a metal, to construct the low-pressure support member 24 whereas a non-thermally stable material, such as plastic, was previously required. It is therefore contemplated that a low-pressure support 24 in accordance with the present invention may endure a greater range of operating temperatures, including, for example, temperatures above about 170° F.

In accordance with the present invention, a cutting element is provided. The cutting element may be disposed adjacent to the seal. The cutting element is configured to open the seal when the seal is released by the low-pressure support member. The cutting element may include, for example, a sharpened blade, a pointed instrument, or a combination thereof.

As illustrated in FIG. 1, cutting element 38 may include a first blade 50 that has a point 52. First blade 50 may extend at an angle, α, from first safety head 34. The position and angle, α, of first blade 50 may be selected to generally align point 52 with arched section 23. Angle α may, for example, be approximately 5°.

As shown in FIGS. 1 and 2, cutting element 38 may also include a second blade 56 that has a second point 58 and a third blade 54 that has third point 60. Each of second and third blades 54 and 56 extend towards point 52 of first blade 50. In addition, each of second and third blades 54 and 56 may be disposed at an angle, β. Angle β may, for example, be between about 0° and 5°.

First, second, and third blades 50, 54, and 56 may be adapted to position points 52, 58, and 60 in close proximity to each other. Alternatively, first, second, and third blades 50, 54, and 56 may be adapted to space points 52, 58, and 60 a certain distance from each other. The relative positioning of each point 52, 58, and 60 may be determined to optimize the tearing characteristics of cutting element 38 for different applications. For example, a different relative positioning of points 52, 58, and 60 may provide better tearing characteristics for differently sized pressure relief devices 20 as well as for different expected pressure differentials.

As shown in FIG. 2, both arched section 23 and second and third blades 54 and 56 may be substantially aligned in a position that is offset from the center of opening 27 in low-pressure support member 24. This positioning may reduce the impact of cutting element 38 and arched section 23 on the flow of fluid through pressure relief device 20 when seal 22 opens. In this manner, the pressure relieving characteristics of pressure relief device 20 may be optimized.

Cutting element 38 and arched section 23 may be disposed to prevent seal 22 from engaging first, second, or third blades 50, 54, and 56 under normal operating conditions. The general alignment of arched section 23 with point 52 of first blade 50 may prevent contact between seal 22 and cutting element 38. In addition, the position of cutting element 38 relative to low-pressure support 24 may be adjusted to prevent contact between seal 22 and cutting element 38. Also, support tongue 29 of low-pressure support member 24 (referring to FIG. 1) may be configured to prevent portion 31 of seal 22 from engaging cutting element 38.

In addition, the configuration of supporting tongue 29 may adapted to prevent seal 22 from engaging first, second, or third blades 50, 54, and 56 under normal operating conditions. For example, supporting tongue 29 may be aligned with first blade 50. In this position, supporting tongue 29 may form a crease or fold in seal 22 under a negative pressure differential. This, or other such configurations, may prevent portion 31 of seal 22 from engaging cutting element 38.

Cutting element 38 ensures that seal 22 opens optimally when low-pressure support member 24 buckles. The buckling of low-pressure support member 24 releases seal 22, which will engage points 52, 58, and 60 of first, second, and third blades 50, 54, and 56. Points 52, 58, and 60 will initiate openings in seal 22. As the seal 22 continues to move in the direction of arrow 48 (referring to FIG. 1), each of first, second, and third blades 50, 54, and 56 will extend the opening in seal 22 thereby causing seal 22 to tear along the length of each blade. This will create a substantial opening through pressure relief device 20 that will relieve the pressure differential.

Cutting element 38 may be configured to achieve one or more tears in the material of seal 22 to thereby increase the flow area through pressure relief device 20. It is contemplated that many design parameters of cutting element 38 may be varied to alter the cutting characteristics of cutting element 38. For example, the shape of the cutting blades and the design of the cutting blade edge, i.e. pointed teeth, serrated teeth, scalloped teeth, number and placement of teeth, square cut teeth, etc., may be varied to alter the cutting characteristics of cutting element 38.

As shown in FIGS. 4a-4j, cutting element 38 may have any of a variety of configurations to optimize the cutting characteristics . For example, the angle of each of first, second, and third blades 50, 54, and 56 relative to safety heads 34 and 36 may be varied. In addition, each of first, second, and third blades 50, 54, and 56 may be curved, waved, or bent.

Figure 4C:
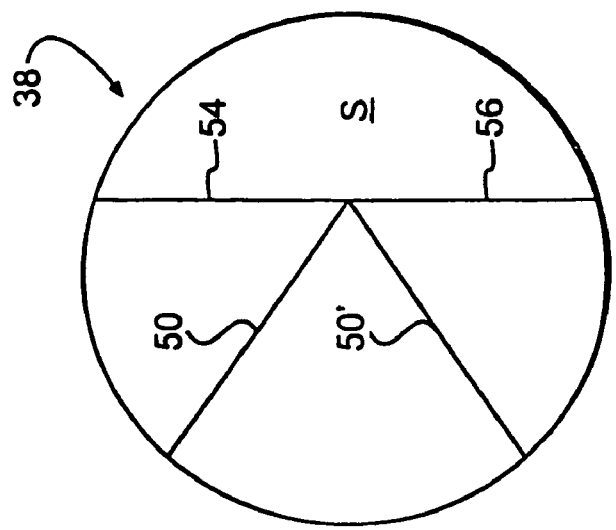
FIGS. 4*a* to 4*j* are top views of a cutting element in accordance with several exemplary embodiments of the present invention.
Figure 4B:
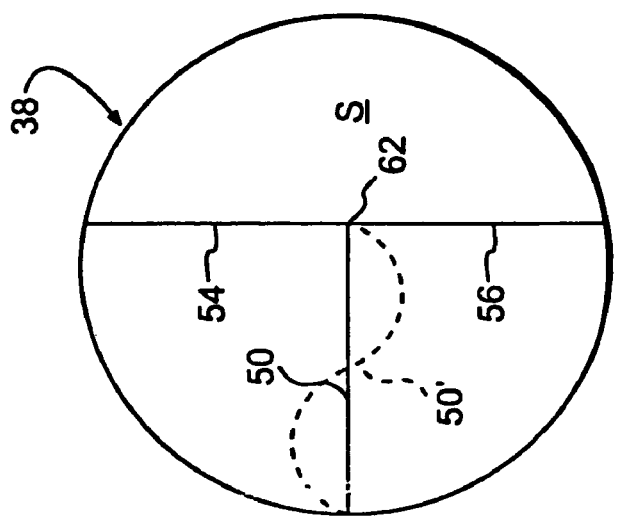
Figure 4A:
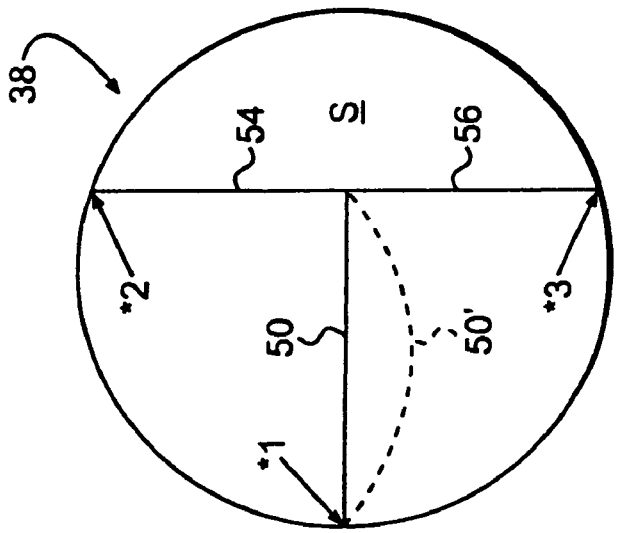

As shown in FIG. 4b, first blade 50 may extend past second and third blades 54 and 56 to a tear-initiating point 62. Tear-initiating point 62 may result in an additional tear in the material of seal 22. The additional tear may lead to an increased flow area through pressure relief device 20.

Figure 4F:
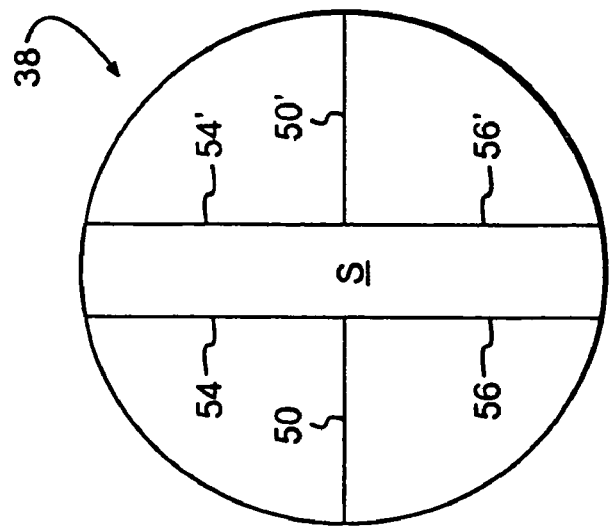
Figure 4E:
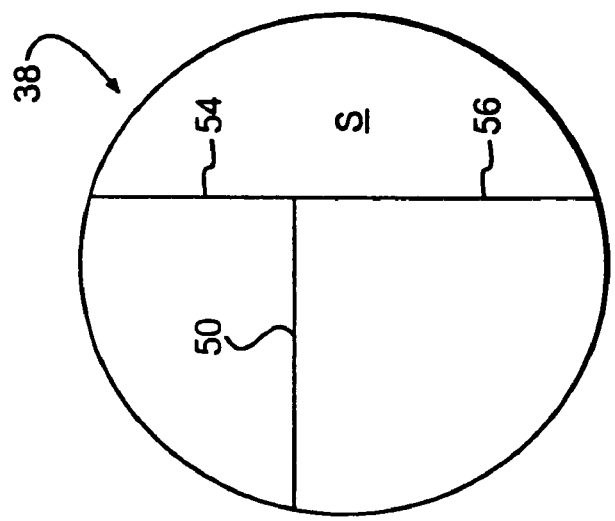
Figure 4D:
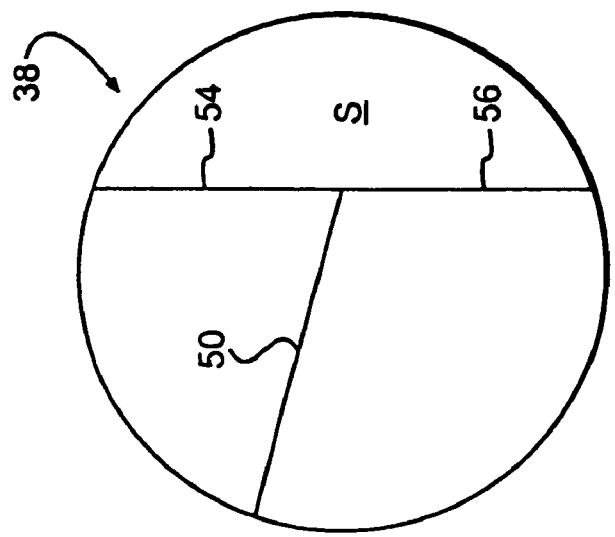
Figure 4I:
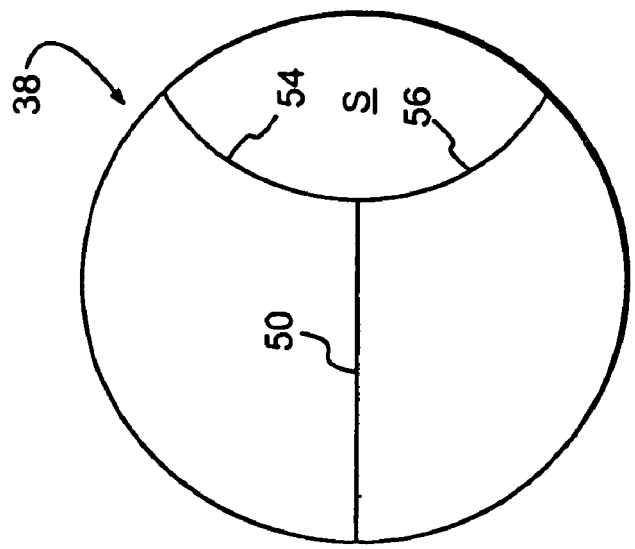
Figure 4H:
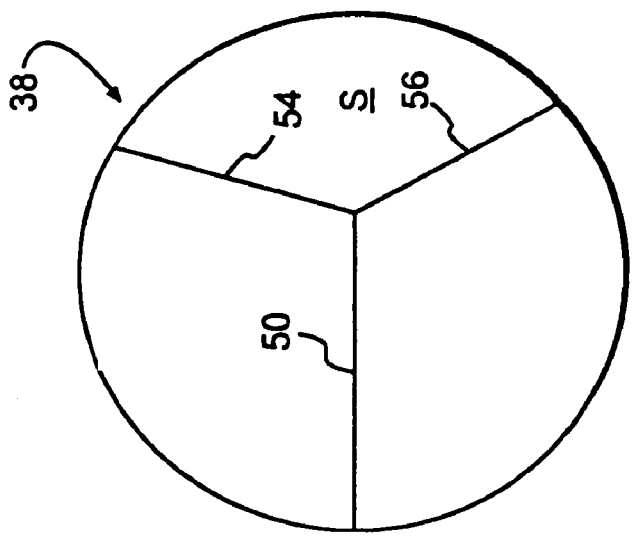
Figure 4G:
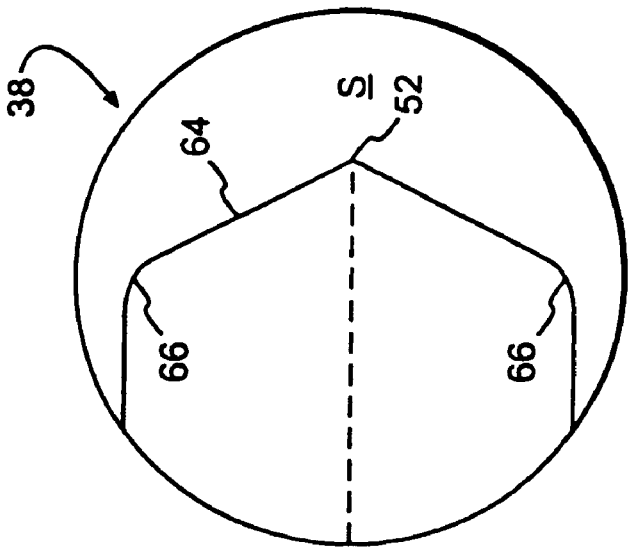
Figure 4J:
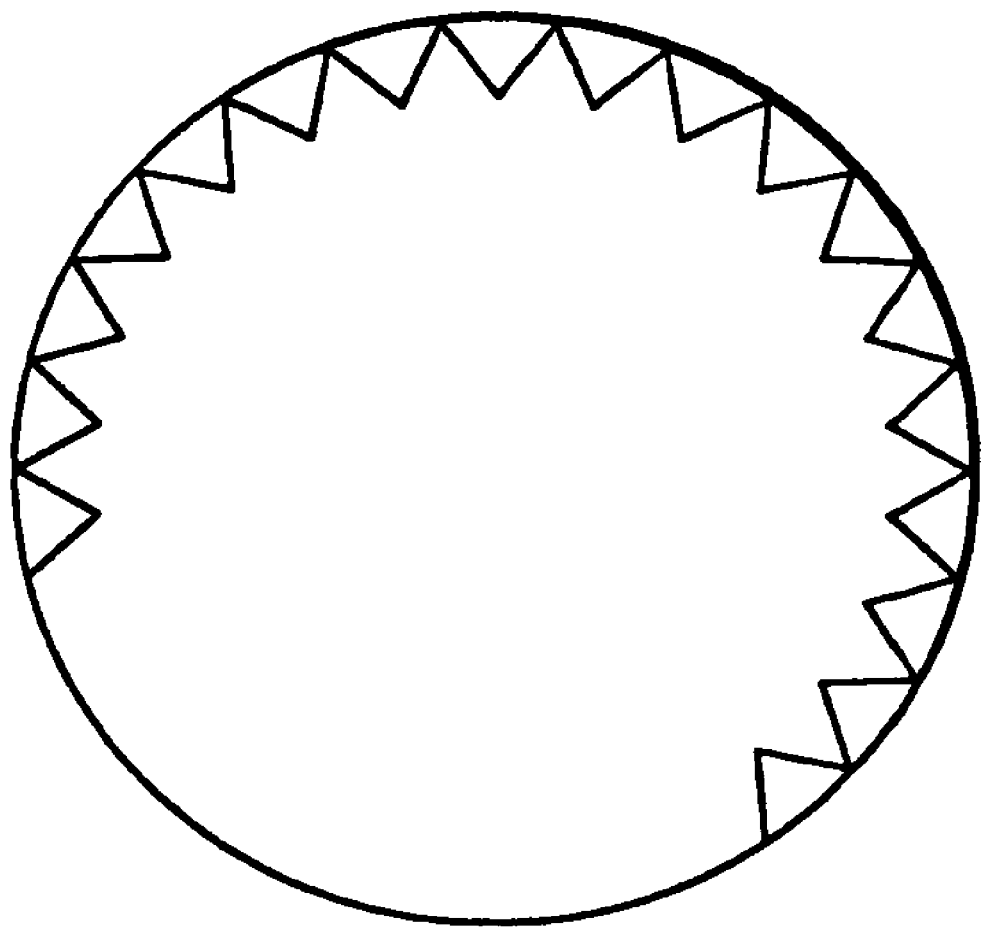

As shown in FIG. 4c, it is also contemplated that cutting element 38 may include an additional blade 50'. As shown in FIG. 4f, cutting element 38 may include an additional set of blades 50', 54', and 56' that mirror blades 50, 54, and 56. Alternatively, as shown in FIG. 4g, cutting element 38 may include a single blade 64 that includes a pair of bends 66 and culminates in point 52. One skilled in the art will recognize that various modifications may be made to the cutting element of the present invention to change the resulting opening in the material of the seal. Each such variation is considered to be within the scope of the present invention. While the cutting blades are illustrated as a component of the safety head 34, they may also be configured to be integral to the rupture disk components 22, 24 and 26 (when required) such that a new blade is provided with each replacement rupture disk, see for example the embodiment of FIG. 4j.

In accordance with the present invention, the pressure relief device may include a high-pressure support. The high-pressure support member has a substantially concave surface and a substantially convex surface. The high-pressure support member is adapted to provide support to the sealing member when the sealing member is subject to a positive pressure differential. The high-pressure support member is further configured to release the seal when the seal is exposed to a positive pressure differential of a pre-determined magnitude.

As illustrated in FIG. 1, a high-pressure support member 26 may have an annular flange 31, a concave surface 33, and a convex surface 35. Annular flange 31 may be sealed between outer peripheral edge 21 of seal 22 and second safety head 36.

Figure 5:
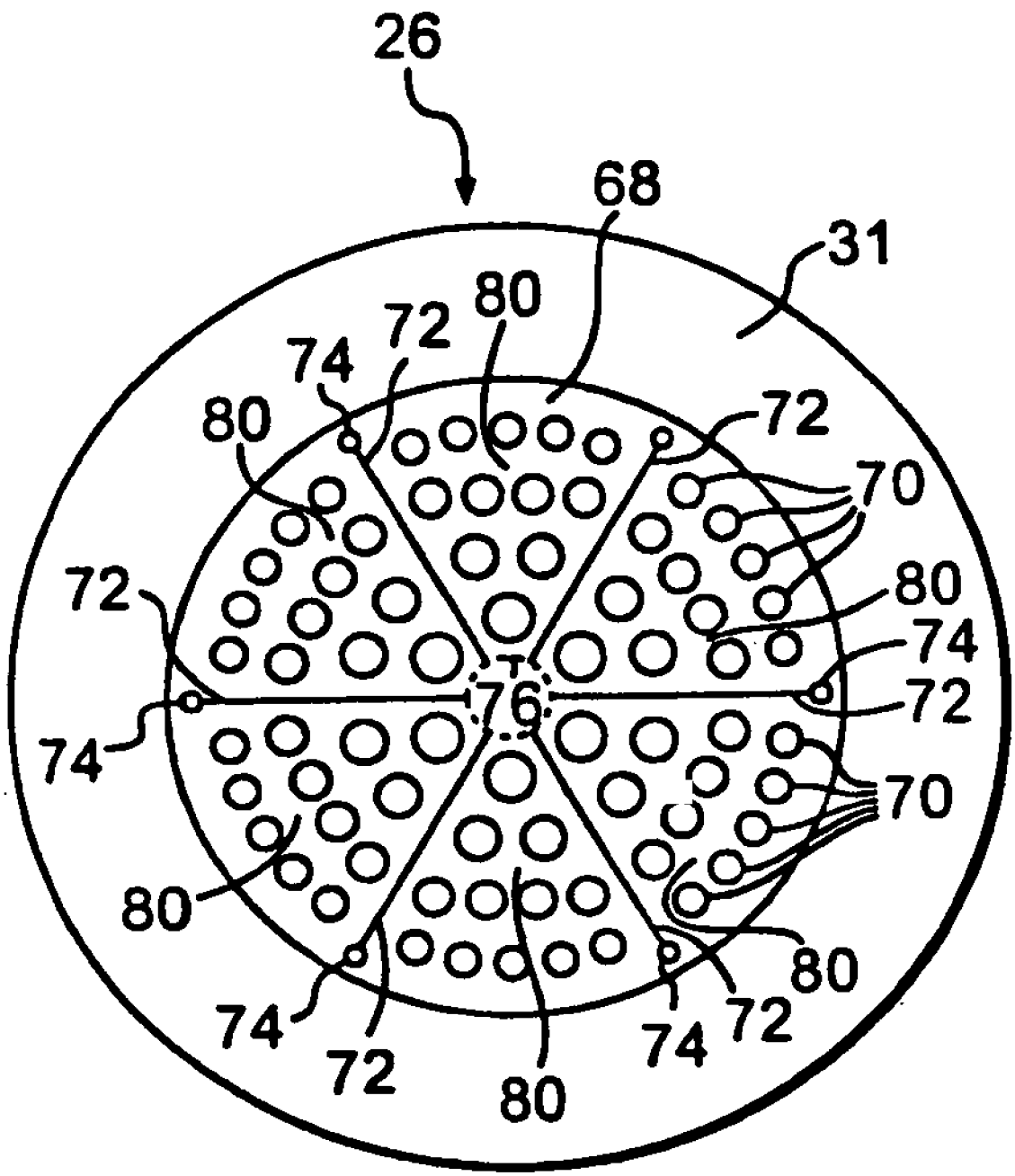
FIG. 5 is a top view of a first support according to an exemplary embodiment of the present invention.

As shown in FIG. 5, high-pressure support member includes a main body 68 that defines the concave and convex surfaces 33 and 35 (referring to FIG. 1). Main body 68 includes a series of lines 72, which may be, for example score lines or slits, that divide the main body 68 into petal sections 80. Each line 72 may terminate in a circular opening 74.

High-pressure support member 26 is adapted to prevent seal 22 from releasing until the positive pressure or high pressure differential in the case of a 2-way rupture disk device reaches a predetermined level. When seal 22 is exposed to a positive pressure differential, i.e. the pressure in bore 30 of first safety member 34 is greater than the pressure in bore 32 of second safety member 36, seal 22 will flex into contact with concave surface 33 of high-pressure support member 26. The pressure differential will result in a force exerted on high-pressure support member 26.

Main body 68 is configured to open along lines 72 when the exerted force reaches a predetermined magnitude. The force at which main body 68 opens may be varied by altering one or more design parameters of high-pressure support 26. For example, shape and material of main body 68 may be varied. In addition, the depth, width, and/or length of lines 72 may be altered. Also, the number and/or location of lines 72 may be varied. In one exemplary embodiment, a line 72 may extend around the majority of the perimeter of main body 68, thereby forming a single petal. It is contemplated that these variations on the configuration of high-pressure support 26, and any other such variations readily apparent to one skilled in the art, are within the scope of the present invention.

When seal 22 experiences a certain pressure differential that results in the predetermined magnitude of force being exerted on high-pressure support 26, the material of main body 68 will tear along lines 72. The continued force exertion on main body 68 will cause main body 68 to split into petal sections 80 thereby creating a central opening through main body 68. The force of the pressure differential will also cause seal 22 to tear. In this manner, fluid may be released in the direction of arrow 46.

As also illustrated in FIG. 1, main body 68 includes a series of openings 70 that extend through the main body 68. Openings 70 provide a flow path through high-pressure support member 26 when seal 22 ruptures when low-pressure support 24 buckles (referring to FIGS. 1 and 2). Openings 70 may be circular as shown. Alternatively, openings 70 may have any other shape, such as, for example, hexagonal, square, triangular, or any other shape that provides for a maximum net flow area through main body 68 without adversely affecting the structural integrity of the high-pressure support member 26.

The pressure relief device of the present invention may be used in a system that requires one-way or two-way pressure relief. For example, in a system that requires one-way pressure relief in response to a relatively low pressure differential, pressure relief device 20 may be equipped with only low pressure support 24 combined with seal 22. First safety head 34 may be engaged with system 20 for light positive pressure relief or with system 30 for light vacuum relief.

In addition, the pressure relief device of the present invention may be used to provide pressure relief in a system that is expected to experience a greater pressure differential in one direction than in the other direction. For example, a system may be designed to withstand a greater positive pressure differential and a lesser negative pressure differential. The pressure relief device of the present invention may be oriented with respect to the system to provide the appropriate relief. For example, first safety head 34 may be disposed adjacent the system so that the low pressure support will release when seal 22 is exposed to a predetermined negative pressure differential. Alternatively, second safety head 36 may be disposed adjacent the system so that the high pressure support will release when seal 22 is exposed to a predetermined positive pressure differential.

In addition, pressure relief device 20 may be equipped with a sensor (not shown) that provides an indication when the pressure relief device opens to relieve a pressure event. For example, as illustrated in FIG. 5, high-pressure support 26 may include an opening 76 at the apex of main body 68. A sensor may be disposed in opening 76 to provide an indication when seal 22 ruptures. The sensor may be any type of sensor commonly used to indicate the activation of a pressure relief device. For example, the sensor may be a BURST ALERT® sensor, a broken wire sensor, a proximity switch, a magnetically activated reed switch sensor, a strip type sensor, a magnetically activated reed switch, or another type of sensor.

The operation of the aforementioned pressure relief device will now be described with reference to the attached drawings.

In operation, pressure relief device 20 is engaged with a system (not shown). As mentioned previously, the system may be a sealed system that operates at pressures slightly above atmospheric pressure or the system may be a vented system whose ventilation passage has become plugged. Engagement of pressure relief device 20 with the system exposes seal 22 to the pressure of the fluid within the system. Preferably, pressure relief device 20 forms a fluid tight seal with the system to prevent any fluid from leaking into or out of the system.

The system is then operated in its normal fashion. If an emergency situation is encountered and the system experiences an over-pressure situation, the force of the fluid within the system acts on seal 22 to move seal 22 against high-pressure support member 26. Main body 68 of high-pressure support member 26 prevents seal 22 from releasing until the positive pressure differential reaches a predetermined level.

When the predetermined pressure differential is reached, the force of the fluid acting on high-pressure support member 26 through seal 22 will overcome the material strength of high-pressure support member 26. Main body 68 will open along lines 72. Openings 74 at the ends of lines 72 may act to prevent fragmentation of main body 68. The material of seal 22 will also tear under the force created by the pressure differential, thereby creating a vent path for the fluid to escape.

If the system is exposed to a negative pressure differential, the resulting force on seal 22 will act to move seal 22 into engagement with low-pressure support member 24. Arched member 23 prevents seal 22 from releasing until a predetermined pressure differential is experienced. When the predetermined pressure differential is reached, arched member 23 buckles at area of weakness 40, thereby releasing seal 22.

Seal 22 moves into contact with cutting element 38. If the material of seal 22 does not tear initially, contact with point 52 of cutting element 38 will puncture seal 22 to initiate a tear. The continued force of the pressure differential causes seal 22 to tear along first, second, and third blades 50, 54, and 56. If pressure relief device 20 is adapted for bi-directional pressure relief, fluid flows through openings 70 in high-pressure support member 26 to relieve the vacuum situation.

The introduction of an area of weakness 40 in arched member 23 may lead to an improved opening of seal 22. Area of weakness 40 may cause a rapid buckling of arched member 23 when the predetermined pressure differential is experienced. The rapid buckling may cause seal 22 to engage cutting element 38 at a relatively high velocity and thereby generate a substantial impact between seal 22 and cutting element 38. This impact may ensure that cutting element 38 punctures and tears seal 22 to create a large, unobstructed flow path through pressure relief device 20.

In the pressure relief device of the present invention addition, the positive pressure support and the negative pressure support are configured to support the seal independently of the other. Thus, the negative pressure differential of the pressure relief device is not dependent upon the positive pressure differential. This allows the pressure relief device of the present invention to be used with any number of systems, including those that are designed to handle a high pressure differential in one direction but only able to withstand a low pressure differential in the other direction.

It will be apparent to those skilled in the art that various modifications and variations can be made in the assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pressure relief device, comprising:
    a sealing member having a domed shape including a concave and a convex side;
    a low-pressure support member configured to provide support along the concave side of the sealing member when the sealing member is subject to a certain pressure differential, the low pressure support member including an annular flange and at least one supporting projection;
    a cutting element configured to puncture the sealing member when the sealing member is subject to a predetermined first pressure differential that causes collapse of the low pressure support member; and
    wherein at least one of the cutting element or the at least one supporting projection is arranged to exhibit radial asymmetry.

2. The pressure relief device of claim 1, further comprising:
    an inlet safety head member positioned on an inlet side of the low pressure support member;
    an outlet safety head member positioned on an outlet side of the sealing member; and
    wherein the inlet and outlet safety head members sealingly engage the low pressure support member and the sealing member therebetween.

3. The pressure relief device of claim 1, further comprising:
    a high-pressure support member configured to selectively provide support to the sealing member and
    wherein the high-pressure support member is configured to rupture when the sealing member and high-pressure support member are subject to a predetermined second pressure differential.

4. The pressure relief device of claim 3, wherein the magnitude of the predetermined second pressure differential is greater than the magnitude of the predetermined first pressure differential.

5. The pressure relief device of claim 3, wherein the high-pressure support member includes a main body having a substantially concave surface and a substantially convex surface, the main body of high-pressure support member having at least one passageway therethrough and being configured to provide support to the convex side of the sealing member when the sealing member is subject to a certain pressure differential.

6. The pressure relief device of claim 5, further including at least one score or slit line formed in and dividing the main body into distinct sections.

7. The pressure relief device of claim 6, wherein the at least one score line includes a series of score or slit lines formed in the main body and dividing the main body into multiple petal sections.

8. The pressure relief device of claim 7, wherein the main body is configured to open along the at least one score or slit line dividing the main body of high-pressure support member when a predetermined force, caused by the predetermined second pressure differential, is exerted upon the sealing member such that the sealing member contacts the concave surface of the main body.

9. The pressure relief device of claim 2, wherein the inlet and outlet safety head members form a pre-torqued assembly.

10. The pressure relief device of claim 1, wherein the at least one supporting projection of the low-pressure support member is an arch extending from a first interior point along the annular flange to a second interior point along the annular flange.

11. The pressure relief device of claim 1, further including a transition section in the low pressure support member extending inwardly from the annular flange and configured to provide support to the sealing member.

12. The pressure relief device of claim 1, including at least one support tongue formed along an interior portion of the annular flange of the low pressure support member and configured to provide support to the sealing member.

13. The pressure relief device of claim 10, wherein the annular flange includes an opening having a centerline and wherein the arch is entirely disposed on one side of the centerline.

14. The pressure relief device of claim 10, wherein the arch is configured to collapse when a predetermined force, caused by the predetermined first pressure differential, is exerted upon the sealing member such that the sealing member contacts the arch.

15. The pressure relief device of claim 10, wherein the arch includes at least one area of weakness.

16. The pressure relief device of claim 15, wherein the at least one area of weakness is formed wholly within the arch.

17. The pressure relief device of claim 15, wherein the at least one area of weakness is formed at a periphery of the arch.

18. The pressure relief device of claim 15, wherein the at least one area of weakness comprises a cut that extends across a segment of the arch and a connecting member connecting the arch across the cut.

19. The pressure relief device of claim 10, wherein the low-pressure support member includes multiple arches with at least two arches having different configurations.

20. The pressure relief device of claim 19, wherein one or more arches include at least one area of weakness.

21. The pressure relief device of claim 1, wherein the cutting element includes a blade and wherein the blade is configured not to contact the at least one supporting projection as the at least one supporting projection collapses.

22. The pressure relief device of claim 21, where the blade extends at an upward angle with respect to a plane including the annular flange.

23. The pressure relief device of claim 22, wherein the cutting element includes a second blade and a third blade, the second and third blades extending toward the interior of the annular flange.

* * * * *